United States Patent
Josa

(10) Patent No.: US 10,021,155 B2
(45) Date of Patent: *Jul. 10, 2018

(54) METHOD AND SYSTEM FOR CONTENT DISTRIBUTION

(71) Applicant: FLOWING CONTENT S.A., Bridel (LU)

(72) Inventor: Charles Josa, Bridel (LU)

(73) Assignee: TRAACKING S.A., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 14/542,049

(22) Filed: Nov. 14, 2014

(65) Prior Publication Data

US 2015/0074388 A1    Mar. 12, 2015

Related U.S. Application Data

(63) Continuation of application No. 12/296,990, filed on Oct. 13, 2008, now Pat. No. 8,914,530.

(51) Int. Cl.
| | |
|---|---|
| H04N 7/167 | (2011.01) |
| H04K 1/00 | (2006.01) |
| H04L 29/06 | (2006.01) |
| G06F 15/16 | (2006.01) |
| G06F 15/173 | (2006.01) |
| H04L 29/08 | (2006.01) |

(52) U.S. Cl.
CPC .......... *H04L 65/60* (2013.01); *H04L 63/0428* (2013.01); *H04L 63/0457* (2013.01); *H04L 67/32* (2013.01)

(58) Field of Classification Search
CPC . H04L 65/60; H04L 63/0428; H04L 63/0457; H04L 67/32

USPC ........ 713/154, 165; 380/200, 255; 709/217, 709/219, 225, 227, 231

See application file for complete search history.

(56) References Cited

U.S. PATENT DOCUMENTS

| | | | |
|---|---|---|---|
| 6,751,670 B1 * | 6/2004 | Patterson | H04L 63/0428 705/51 |
| 8,914,530 B2 * | 12/2014 | Josa | H04L 63/10 709/217 |
| 2002/0023058 A1 * | 2/2002 | Taniguchi | G06F 21/10 705/57 |

* cited by examiner

*Primary Examiner* — Aravind K Moorthy
(74) *Attorney, Agent, or Firm* — Cantor Colburn LLP

(57) ABSTRACT

A centralized distribution server includes a converter for embedding content data into a digital delivery stream and a transmitter for transmitting the stream to at least one of the subscriber terminals via a forward network channel. The terminal includes a receiving component for receiving the stream from the centralized server and an interface component for enabling access to the stream and/or the content data embedded therein by a subscriber. The terminal includes a first component for generating a first acknowledgement upon receipt of the stream by the receiving means, and a second component for generating a second acknowledgement upon access of the stream and/or the content data embedded therein by the user. The acknowledgements are transmitted to the centralized distribution server via a return network channel. The centralized distribution server includes a feedback management module for receiving the two acknowledgements transmitted from the terminal to the centralized distribution server.

46 Claims, 7 Drawing Sheets

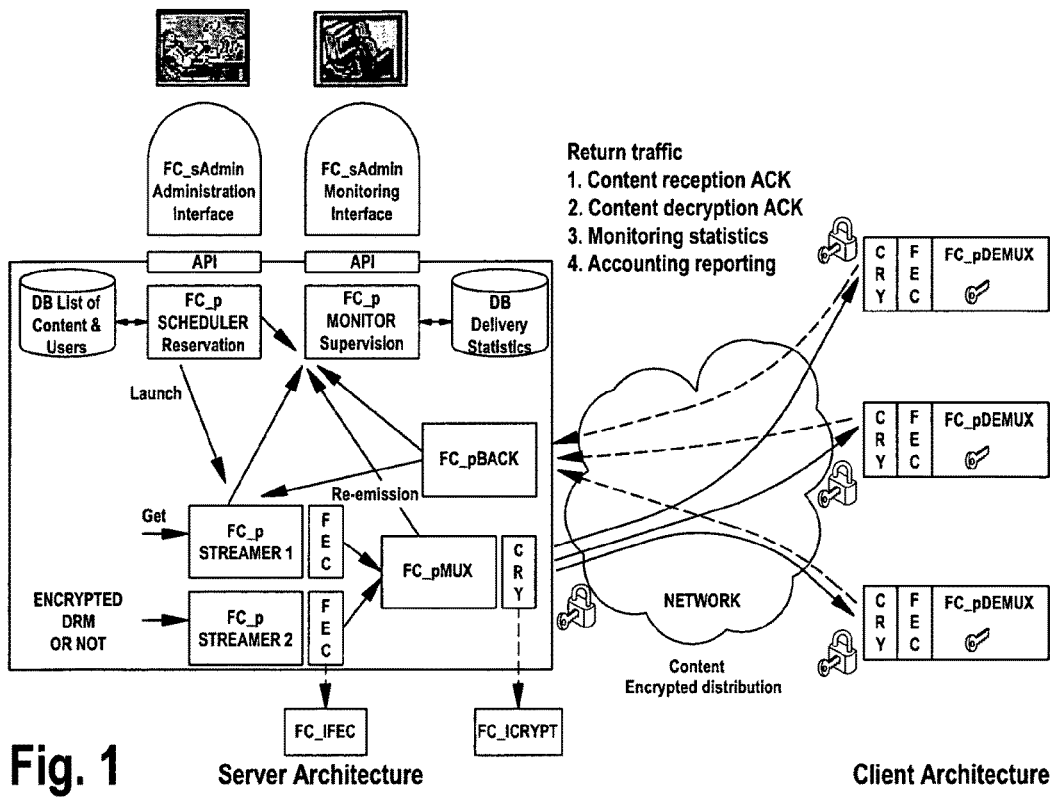
Fig. 1 Server Architecture / Client Architecture
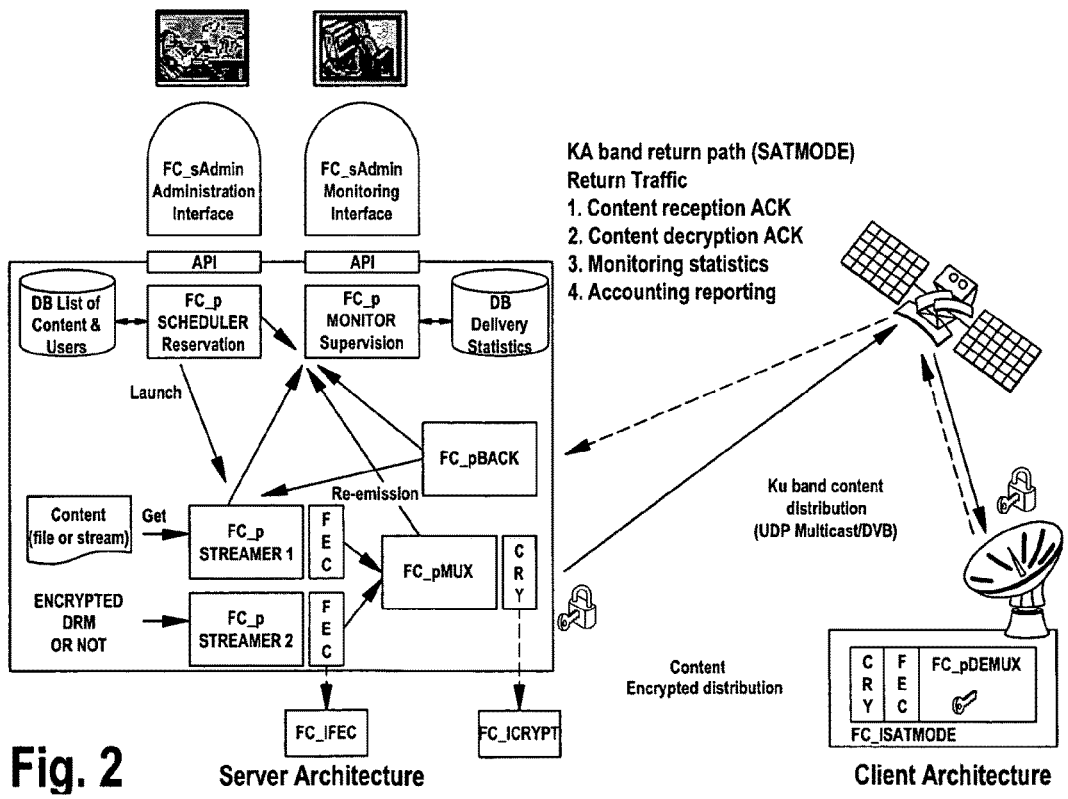
Fig. 2 Server Architecture / Client Architecture File start  File start  End stream  End file

METHOD AND SYSTEM FOR CONTENT DISTRIBUTION

CROSS-REFERENCE TO RELATED APPLICATIONS

This is a continuation of U.S. patent application Ser. No. 12/296,990 filed on 13 Oct. 2008 which claims priority to International Application No. PCT/EP2007/053201 filed on 3 Apr. 2007. This application is further related to and claims the benefit of European Patent Application No. 06112654.6 filed on 13 Apr. 2006. All of said applications are herein incorporated by reference in their entirety.

FIELD

The present disclosure generally relates to a method and a system for content distribution over a network.

BACKGROUND

Various kinds of information may be presented in a digital content format, including audio, video, text, images and multimedia information. Such digital content may be rendered by hardware playback devices and by computer systems operating appropriately configured software playback programs.

The convergence of technological advances in the compression, storage and transmission of digital data has resulted in a global communications network that allows digital content to be distributed rapidly to a large number of potential customers. At the same time, this technological convergence has enabled unprecedented quantities of digital content to be copied flawlessly and distributed to a large number of people. For example, users easily may exchange unprotected digital files by electronic mail or by direct file transfer over the Internet. Users also may access and download digital content posted on a web page using a conventional web browser application program executing on a computer system.

Accordingly there is a need for a content distribution system, which offers a full traceability of digital content distribution to a number of subscribers.

SUMMARY

The network-based content distribution system according to the present invention comprises a centralized distribution server and a number of subscriber terminals. The centralized distribution server comprises converter means for embedding content data into a digital delivery stream and transmitting means for transmitting said digital delivery stream to at least one of said subscriber terminals via a forward network channel. The at least one subscriber terminal comprises receiving means for receiving said digital delivery stream from said centralized server and interface means for enabling access to said digital delivery stream and/or the content data embedded therein by a subscriber. According to the invention, the at least one subscriber terminal comprises first means for generating a first acknowledgement (type 1) upon receipt of said digital delivery stream by said receiving means and second means for generating a second acknowledgement (type 2) upon access of the digital delivery stream and/or the content data embedded therein by the user via the interface means, said first and second acknowledgements to be transmitted to the centralized distribution server via a return network channel and said centralized distribution server comprises a feedback management module for receiving said first and second acknowledgements transmitted from said at least one subscriber terminal to the centralized distribution server.

In a preferred embodiment, said feedback management means further comprises means for generating a first message and a second message respectively upon receipt of said first and second acknowledgements transmitted from said at least one subscriber terminal to the centralized distribution server. These first and second messages prove that the status of the digital delivery stream and/or the content data embedded therein on the at least one subscriber terminal is known by the centralized distribution server and that said status is thus confirmed.

The present disclosure thus enables full traceability of content distribution over a network by the generation of two distinct acknowledgements at the subscriber side, one upon receipt of the data containing the content to be distributed, and on upon access of the user to the content. These acknowledgements are transmitted back to the feedback management module of the centralized distribution server, so that the receipt of and access to the delivered content may be fully logged.

It will be appreciated, that the content distribution according to the present invention is not limited to a specific network type. In fact, the streamed data flow generated by the centralized distribution server can exploit any type of physical telecommunications networks: a LAN, a corporate network, the Internet (via VPN tunneling), and any cable or satellite network. In particular, the centralized distribution server can handle the same delivery concurrently over multiple different forward network channels (for instance a same simultaneous transmission over both a DSL network and a satellite network). Furthermore, the forward network channel for transmitting the delivery stream and the return network channel for transmitting the acknowledgements to the centralized distribution server do not necessarily be of the same type. Finally the content may be delivered to any suitable subscriber terminal, which may be a dedicated device or a standard computer with a suitable software client application for receiving and accessing the content.

In a preferred embodiment of the disclosure said converter means for embedding content data into a digital delivery stream comprise at least one streamer module for converting content data into a data stream. The streamer module collects digital content (file or stream) to be transmitted and converts it into a transmittable stream. By converting the content, the streamer module also manages the content transmission bitrate. Content can be located on any content storage device (e.g. a computer) that is reachable by the streamer server. Content can e.g. be fetched via a file name on the LAN (possibly via NFS), an URL address corresponding to a file location on a computer connected to the Internet, an IP address and TCP port corresponding to a TCP streamed content, a UDP port where a UDP streamed content is forwarded or the like.

In a further preferred embodiment of the disclosure, said converter means for embedding content data into a digital delivery stream comprise a multiplexer module, said multiplexer module for converting at least two individual data streams into a mixed stream, said mixed stream containing data packets of said at least two individual data streams. In this embodiment of the invention said receiving means of said at least one subscriber terminal comprises a de-multiplexer module for de-multiplexing said mixed stream into said individual data streams. The multiplexer module enables the mixing (multiplexing) of two or more concurrent data streams coming from several sources into a unique stream directed to the physical output interface. It should be noted, that the data streams to be multiplexed may be the initial content to be distributed, if this content is in the form of a suitable stream, or be generated by one or more streamer modules, which convert file based content into a transmittable stream. The de-multiplexer module on each subscriber terminal enables the reception of the digital delivery stream and/or the content data embedded therein sent by the multiplexer module over the forward network channel and the subsequent and separate restoration of individual recipient content.

In order to optimize the use of the accessible bandwidth within the network, the centralized distribution server preferably comprises a scheduler module for managing content distribution planning and scheduling. The scheduler module may provide upstream delivery planning and scheduling of media that are requested for transmission. Broadcast (satellite) capacity is fixed over periods of time and limited. The scheduler is able to limit the total amount of data (file or stream) that can be transmitted at a given time. It will determine in advance whether a file or a "stream" can be integrated to the ongoing delivery stream.

In an advantageous embodiment of the disclosure, the feedback management module comprises means for interacting with said at least one streamer module, to cause said streamer module to resend possibly missing data upon receipt of a corresponding acknowledgement by said at least one subscriber terminal. This embodiment ensures reliable transmission of the content to be delivered, as any missing data, which could have been lost during the transmission, will be resent until the feedback management module receives the acknowledgement of the subscriber, that the data is entirely received.

Nowadays encryption of valuable content has become essential to guarantee a maximum protection of copyright holders. Current distribution networks (DSL Internet, satellite broadcasting) enable users equipped with the correct connection equipment (DSL modem, satellite dish) an easy and fast access to lots of content. Such an opportunity can become a flaw when it comes to the question of limiting content availability to groups of users who are duly authorized. Only encryption mechanisms which apply on both content itself (DRM for instance) and during transmission over the network can efficiently protect this right. In a further embodiment of the invention, the centralized distribution server therefore comprises an encryption module for encrypting said data stream and/or said mixed stream into an encrypted stream, and at least one subscriber terminal comprises a decryption module for decrypting said encrypted stream into an unencrypted data stream and/or an unencrypted mixed stream and depending on the embodiment for decrypting embedded encrypted content data into unencrypted content data. The encryption of content data to be embedded in the data stream prior to the transmission enables to prohibit access to the delivered stream by any person, which has not acquired the required license to access the content. In this context it will be appreciated, that the content itself may be encrypted prior to the conversion into a stream and that after the conversion, the resulting stream is again encrypted on the fly prior to its transmission.

The encryption of the delivery stream may be achieved by any suitable encryption algorithm. The encryption module may e.g. use a standard algorithm like AES using the 2 methods: ECB for Electronic Cook Book and CBC for Cipher Block Chaining with keys of 128, 192 or 256 bits for the encryption of content and stream. In a more preferred embodiment of the invention, the encryption module uses an encryption algorithm based on modulo arithmetic with encrypted private keys (e.g. of 128 bits) using ECB or CBC. In both cases CBC will only be used in association with the TCP Internet Protocol.

On the subscriber side, the decryption of the encrypted delivery stream may be considered to constitute an access to the content to be distributed. In this case, said second means for generating a second acknowledgement are responsive to said decryption module and generate said second acknowledgement upon decryption of the encrypted stream into an unencrypted data stream and/or an unencrypted mixed stream. In another possible embodiment, if e.g. the delivery stream is formed by an encrypted mixed stream in which the content embedded into the individual streams is also encrypted, decryption of the encrypted mixed stream and the subsequent de-multiplexing of the multiplexed stream in order to restore the encrypted content data embedded therein may be considered to be part of the reception process only and accordingly trigger the generation of the first acknowledgement (type 1). In this case, only the subsequent decryption of the encrypted content data may be considered to constitute an access to the content to be distributed and the second acknowledgement is only generated upon decryption of the encrypted content data into the unencrypted content data.

In a variant of the disclosure, the centralized distribution server may comprise a forward error correction module for providing said data stream and/or said mixed stream with a redundant coding scheme, and the receiving means of said at least one subscriber terminal may comprise a corresponding error correction module for reconstituting data lost during transmission based on said redundant coding scheme. The forward error correction module can be applied separately to different content meaning that the multiplexer can mix simultaneously both error-corrected and non error-corrected content and that each de-multiplexer on subscriber terminals can process the content accordingly.

Finally said centralized distribution server preferably comprises a monitor module for monitoring information from said at least one streamer module and/or said multiplexer module and/or said scheduler module and/or said feedback management module and/or said encryption module and/or said error correction module and for controlling the operation of said at least one streamer module and/or said multiplexer module and/or said scheduler module and/or said feedback management module and/or said encryption module and/or said error correction module.

In conclusion it will be appreciated, that the present disclosure relates to a system and method for content distribution from a central point (server) to a group of users (client) over any telecoms networks. The distribution is point to multipoint via the forward channel: control information of the distribution is sent back by the user to the central point via a return channel. Forward and return channels can be any physical networks and not necessary the same. Users can be spread over different forward and return channel networks that can be concurrently operated by the system.

The distribution of the content is under the programmatic command of the central distribution server. The distribution is fully managed (bandwidth optimization via scheduling at central point) and supervised from end-to-end on the forward and return channels.

The central point server can concurrently accept multiple input content sources (file or stream) upstream and distribute them over multiple output forward channels.

Traceability is implemented via the tracking of 2 acknowledgments sent by the user to the central point: the first one when content is received; the second one when content is accessed (e.g. via decryption). The disclosure thus enables tracking a delivery history e.g. for such purposes as accounting to prevent illegal capture of the content across the distribution chain. Moreover, the 2-type acknowledgments sent by the user to the server and their subsequent receipt confirmation by the server reinforce the traceability of content delivered at any time during the transmission process.

It will be noted, that the central point server system may further return an acknowledgement to the subscriber to confirm that the 2-type acknowledgements sent by the user over the return channel have been effectively received. Content can be then accessed otherwise it remains out of the users' reach (encrypted). The server always knows the status of content with certainty at the users' sites and traceability is guaranteed.

In a preferred embodiment, the system provides robustness and load-balancing of the distribution process by means of a set of 6 cross-interacting but independent modules (streamer, multiplexer, scheduler, monitor, feedback management, de-multiplexer). The central distribution server preferably operates five of these modules (streamer, multiplexer, scheduler, monitor, feedback management), whereas the client terminal may operate the de-multiplexer module, which is part of the receiver, and the streamer and multiplexer module to return acknowledgments and any other information to the central point.

The main function of the different modules may be summarized as follows:

The scheduler module provides delivery planning and scheduling to optimize throughput: it enables delivery reservations subject to the real time availability of network capacity. The streamer module executes one delivery subject to the scheduler command. The streamer performs if required the encryption of the content itself and if required the forward error correction processing of the content. The streamer then passes the data flow to the multiplexer module, which implements the on-the-fly encryption of the output mixed stream. The de-multiplexer module decrypts on-the-fly the mixed stream produced by the multiplexer, restores from the mixed stream the individual stream; acquires the data packets from the individual stream, checks whether the content data embedded therein is authorized and if yes restores the initial content; sends back the associated acknowledgements (reception and decryption) over the return channel until it is acknowledged by the server.

The reception acknowledgment is automatically sent by the de-multiplexer to the central distribution server. The decryption acknowledgment can be sent automatically (in this case, content is automatically decrypted after reception via a procedure forwarded with the content and executed at reception) or send when the user requests on demand the content decryption (in this case, the de-multiplexer provides a user interface). The monitor module collects monitoring data from the other modules with no direct interaction (exchange goes through a monitoring library module FC_l-Monitor—l stands for library—which is linked to all the monitored modules). The feedback management module receives acknowledgments coming from the users' de-multiplexer module and may request one of the streamer modules (via a direct access without reservation from the scheduler) to re-transmit the possibly missing data or the acknowledgments returned by the server.

It should be noted that the decomposition into a set of 6 independent cross-interacting functions provides robustness to prevent the distribution process to stop when one function failed, and load-balancing to address adaptability to concurrent variable workloads, thus ensuring the reliability of the content transmission. If e.g. the scheduler module stops, then delivery reservation is not possible anymore; but ongoing deliveries still continue and supervision is still enabled (the scheduler module failure is known). If one of the streamer module stops, then only the delivery associated with that streamer module stops; all the other deliveries continue and supervision is still enabled (that particular streamer module failure is known). If the multiplexer module stops, then distribution stops but delivery reservation is still possible. Supervision remains also enabled (the multiplexer module failure is known) particularly on the associated forward channel network. Each multiplexer module instance is made redundant by a second one. If the de-multiplexer module stops, then the user cannot receive any content; but content already received and not acknowledged by the server remains non accessible and thus protected. If the monitor module stops, then supervision is not possible anymore but reservation and delivery remain available. Content traceability and protection remains preserved. Finally if the feedback management module stops, then it is not possible anymore to acknowledge content reception (or re-transmit possibly lost data) or content access. Content traceability and protection remains preserved. Reservation, delivery and monitoring are still available.

It will be noted, that the modules corresponding to the 6 functions can be distributed over separate computers that can be connected via LAN or WAN networks without alteration of the distribution functioning. Furthermore, the workload necessary to concurrently acquire several content sources can be distributed over different instances of the streamer module. Finally multiple output forward channels (terrestrial, satellite, 3G . . . ) can be managed by different instances of the multiplexer module. Several instances of the multiplexer module (several multiplexer processes) can be used for 2 reasons: 1. to provide redundancy in case one multiplex process fails and stops, 2. to enable the multi-stream distribution over several physical network channels of a single source of content after its acquisition.

In preferred embodiments of the system, security is implemented in a symmetric double-encryption scheme where both content itself is encrypted as well as its delivery stream on-the-fly. It is thus possible to select a group of subscribers for which the reception of specific content is granted. The stream is encrypted on-the-fly for all users and a specific content sent in the stream to the group of authorized users may be encrypted once more (double symmetric encryption scheme based on private keys). The users may be authorized via the preliminary transmission of a private key (called Content Access Key—$CAK_i$ for Content of rank i) to receive and access a specific content (Content of rank i). The private key is itself encrypted and stored encrypted on the subscriber's terminal. Content of rank i is acquired by the terminal if and only if $CAK_i$ is present; otherwise it is rejected by the de-multiplexer. The private key is used when it comes to access the specific content (decryption) and to decrypt content: the private key is beforehand decrypted by a decrypting key itself encrypted. The decryption keys at users' side may be periodically updated and an update acknowledgment may be transmitted to the central server.

It is believed that the method for content distribution disclosed above provides the optimum approach when it is to define and implement a fully centralized, controlled, secure, and supervised content distribution strategy where the central distribution server decides and organizes all actions. This method guarantees the protection of copyright owners when it comes to distribute valuable content. This method implements real time throughput optimization by managing bandwidth at central point subject to delivery constraints and capacity availability.

BRIEF DESCRIPTION OF THE DRAWINGS

The present disclosure will be more apparent from the following detailed description of a not limiting embodiment with reference to the attached drawings, wherein FIG. 1: shows a general view of an embodiment of a content distribution system relying on a terrestrial network;

FIG. 2: shows a general view of an embodiment of a content distribution system relying on a satellite based network;

DETAILED DESCRIPTION OF THE DRAWINGS

Figure 3:
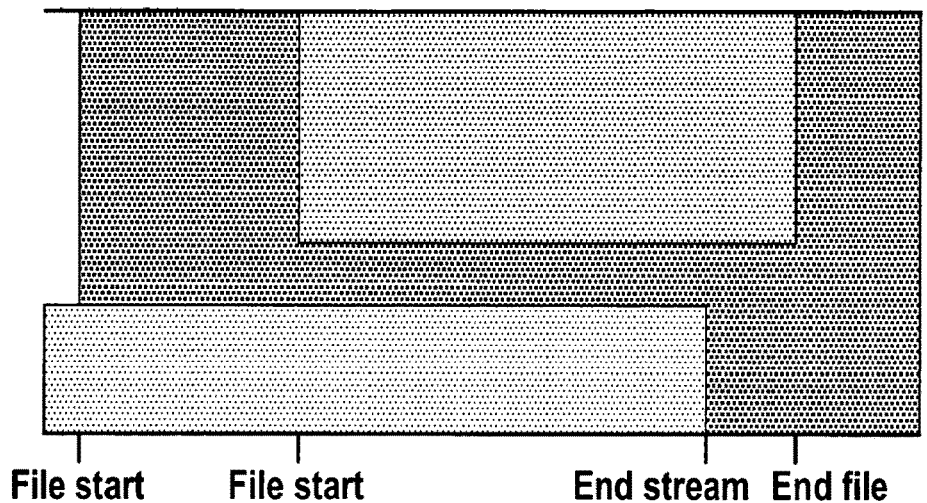
FIG. 3: illustrates the dynamic bandwidth allocation for content transmission.
Figure 4:
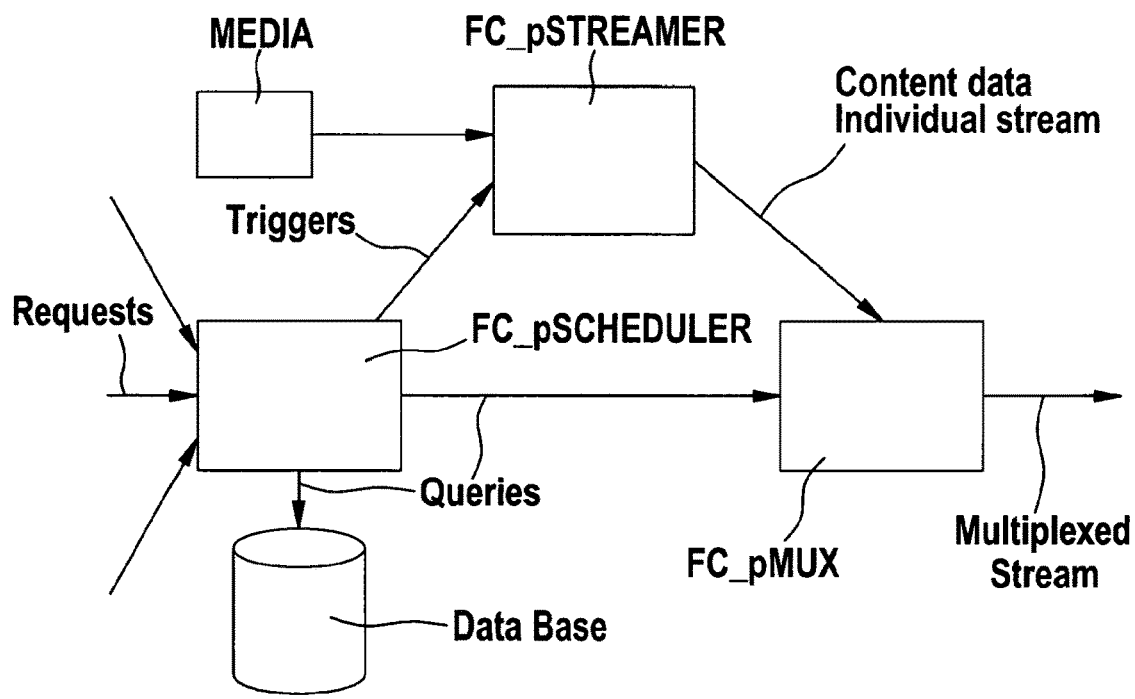
FIG. 4: illustrates the interaction of several modules with the scheduler.

FIGS. 1 and 2 represent a general view of two embodiments of a content distribution system, wherein digital content is delivered to a group of subscribers via a standard terrestrial network (FIG. 1) or via a satellite network (FIG. 2). In both embodiments, the system comprises a number of modules, which interact in order to guarantee a safe and reliable transmission of the content to the individual subscribers:

A scheduler module FC_pSCHEDULER (1) (resources manager)—where p stands for process—processes delivery requests and makes reservation. It manages the bandwidth, schedules the transmissions with respect to time constraints in compliance with to delivery requirements. A streamer module or a group of streamer modules FC_pSTREAMER (2) collects content for and forwards a single stream to a multiplexer module FC_MUX (4). The forward error correction library module FC_lFEC (3)—where l stands for library—is associated to the FC_pSTREAMER and encodes if requested the stream with redundant data blocks to make it more resilient to possible disruptions of the physical signal.

The multiplexer module FC_pMUX performs the mixing (multiplexing) of concurrent data streams coming from several sources (and associated streamer modules) into a unique mixed stream directed to the physical output interface. The encryption library module FC_lCRYPT (5) is associated to the FC_pMUX and encrypts the mixed stream so that it remains inaccessible to non-authorized receivers (or listeners). On the subscriber or client side, the de-multiplexer or receiver module FC_pDEMUX (6) captures the data that it has been authorized to from the interface; it decrypts (reverse FC_lCRYPT) on-the-fly the mixed stream, de-multiplexes and decodes (reverse FC_lFEC), and finally restores the original content.

The feedback management module FC_pBACK (7) is in charge of receiving and processing all acknowledgement information coming from the return channels (client to server return link if available), such as the file reception and the file decryption acknowledgements.

The monitor module FC_pMONITOR (8) provides real time supervision of the end-to-end delivery chain. It is in charge of collecting monitoring information from the different modules and managing the reporting information provided by the FC_pBACK module.

Finally a web-based administration interface FC_sADMIN—where s stands for screen—enables the administrators to organize, manage and monitor their different content distribution scenarios to users: delivery information such as type/location of content, groups of receivers, authorizations, scheduling, time-slot, reporting of deliveries and receptions by users.

Detailed information on the different modules: FC_pSCHEDULER (1), FC_pSTREAMER (2), FC_lFEC (3), FC_pMUX (4), FC_lCRYPT (5), FC_pDEMUX (6), FC_pBACK (7), FC_pMONITOR (8) and their respective operation will be described below in the following:

1. FC_pSCHEDULER

The FC_pSCHEDULER provides upstream delivery planning and scheduling of media that are requested for transmission. Broadcast (satellite) capacity is fixed over periods of time and limited. The scheduler is able to limit the total amount of data (file or stream) that can be transmitted at a given time. It will determine in advance whether a file or a "stream" can be integrated to the ongoing delivery stream.

The two basic categories of content are considered:
a) file (movie, document . . . ), which transmission bitrate allocated by the scheduler will depend on the transmission start date and the end date at which content is delivered to the subscriber, and
b) stream (real time) which transmission bitrate is fixed when the transmission starts.

The content manager makes a reservation to transfer a file: the FC_pSCHEDULER will compute the bandwidth which is required to deliver the file within the end date and will accept or not the reservation given the capacity available during that period of time.

Files offer the greatest flexibility in terms of scheduling since they permit to modify in real time the transmission bit rate in order to enable simultaneous additional content (file or stream) transmissions to be carried out within the bandwidth limitations and consistently with the delivery time requirements. On the other hand, stream bit rate cannot be adapted that way because streams require a fixed (not variable) bit rate during the whole transmission.

FIG. 3 illustrates the dynamic bandwidth allocation for content transmission. The represented example shows how a file (in black) instantaneous transmission bit rate can be cut down to let a new file (in dark grey), which delivery time is shorter, take over the bandwidth for transmission. It is noticed that the (light grey) stream bit rate cannot be modified during diffusion but once it is over (or interrupted) then bandwidth is released and made available to serve the next transmissions.

The FC_pSCHEDULER process is attached to a unique forward channel network. The FC_pSCHEDULER process organizes transmissions subject to delivery constraints and manages capacity for the FC_pMUX process, which outputs a single mixed stream over the forward channel network. For a given forward channel network, there are one and only one FC_pSCHEDULER and FC_pMUX processes. Each data stream produced by the FC_pSTREAMER processes has its own delivery time constraints, which the FC_pSCHEDULER computations refer to.

The FC_pSCHEDULER will first request from the FC_pMUX the media which transmission is ongoing, and then from a data base the media to be transmitted in the future. On the basis of these answers, overall delivery scheduling computations can be made. While abiding by the overall media delivery scheduling rules, the FC_pSCHEDULER triggers the FC_pSTREAMER, which fetches the media and forwards it to the FC_pMUX.

2. FC_pSTREAMER

Figure 5:
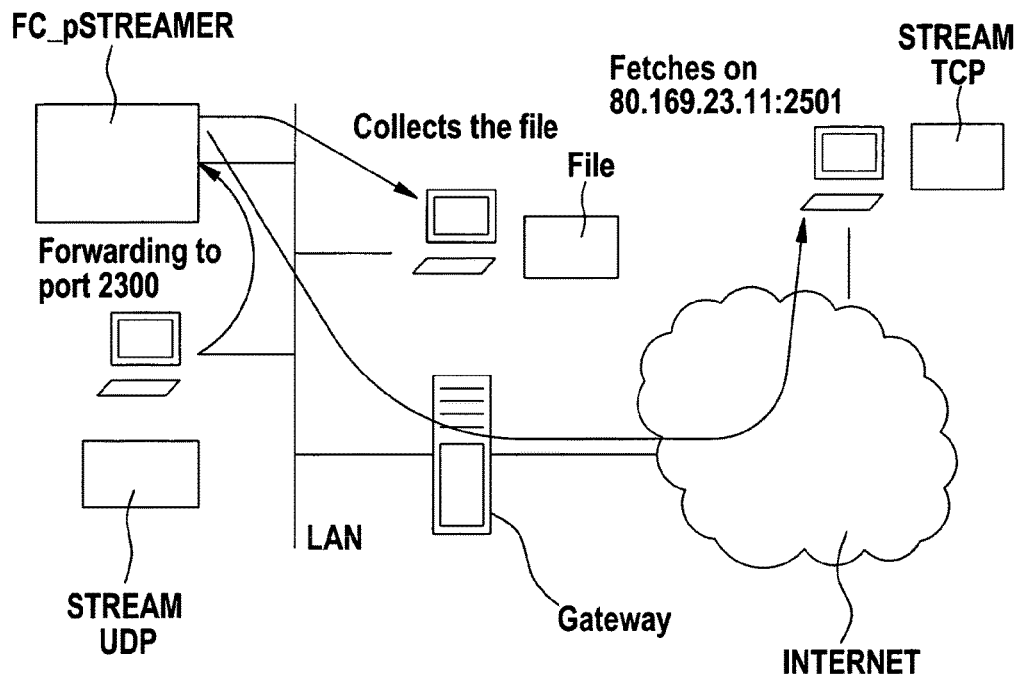
FIG. 5: illustrates the different methods for content acquisition.

The FC_pSTREAMER collects the media (file or stream) to be transmitted and organizes it for the FC_pMUX. It also manages the content transmission bit rate. Content can be located on any computer that is reachable by the streamer server (see FIG. 5). It can be fetched via:

a) a file name on the LAN (possibly via NFS).
b) a URL address corresponding to a file location on a computer connected to the Internet.
c) an IP address and TCP port corresponding to a TCP streamed content.
d) a UDP port where a UDP streamed content is forwarded to.

In order to identify the initial content stream within the multiplexed stream, a channel ID (logical) is allocated by the FC_pSTREAMER.

Figure 6:
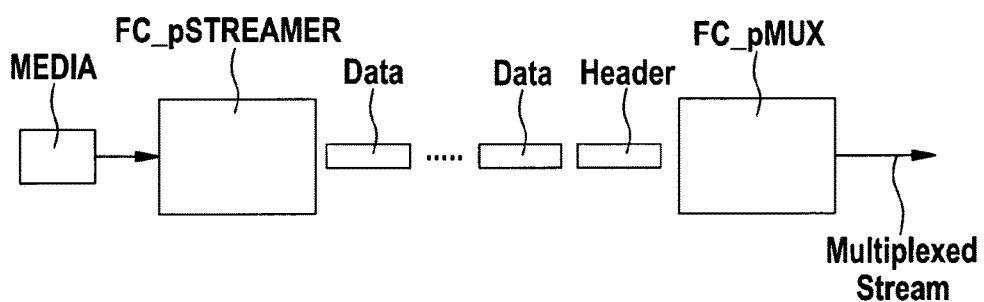
FIG. 6: illustrates the principle of splitting media into blocks.

The communication between the FC_pSTREAMER processes and the FC_pMUX is at the heart of the server system. The FC_pSTREAMER prepares and produces a single stream, which is going to be mixed to other single streams by the FC_pMUX (see FIG. 6). This preparation consists in three steps:

a) to provide a header packet which contains all content properties and the rules to process content at reception by the FC_pDEMUX (receiver).
b) to "split" the initial content into fixed size packets for multiplexing
c) to control the stream stability to the FC_pMUX so that the transmission bit rate remains constant.

The header packet can be possibly re-transmitted (carousel): this is necessary for real time streamed content (a radio channel for instance) when a receiver was not listening at the beginning of the transmission and has missed the frame header packet. The FC_pDEMUX needs to receive this header packet and to process it just to be able to capture the radio signal.

An important property of the packet header is to enable the dynamic modifying of the stream type. File based content can indeed be converted into a streamed content for the receiver. Vice versa stream based content can be stored as a file on the receiver. This powerful functionality may be used to implement content recording and to also increase the overall security system.

3. FC_IFEC (Forward Error Correction)

Network physical infrastructures although constantly improved cannot always deliver a perfect-quality signal. It is not necessarily a question of networking equipments: for instance under extreme conditions such as severe storms or satellite to mobile, the data transmissions physical signal can be disrupted for short periods of time. More frequently, packet collision due to traffic congestion may result in data (packet) loss.

In order to compensate for this situation especially with UDP, the present content distribution system implements in real time a dedicated redundant coding (Forward Error Correction) to strengthen the signal and optimize the reception quality. Even if the signal is interrupted for a short time, the system will reconstitute potentially lost data so that the end-user does not experience any deterioration of the transmission.

In a preferred embodiment, the FC_IFEC library module implements an original technique so that the FC_pDEMUX (receiver) does not feel the effect of these transmission errors. The FC_IFEC library module provides the data stream produced by the FC_pSTREAMER with a redundant coding scheme that will make it resilient to short signal outage.

The stream (generated by the FC_pSTREAMER after application of the FC_IFEC) will be inserted with redundant information after two operations: first an "Exclusive OR" XOR computation is made on frames and matrices, second blocks inside a group of matrices are re-arranged (interleaving over a period of time to be fixed according to specific parameters). A frame is made by a set of blocks (8 usually). For each frame a XOR block (computing is made on all the frame blocks) is inserted into the stream. A matrix is made by a set of frames (8 usually). Pour each matrix a XOR block (corresponding to the computing of the matrix diagonal elements) is inserted into the stream. A group of matrices is a set with as many matrices as the number of columns inside a matrix (8 usually). If i is the column index of a block, j the row index and k the matrix index in the group, then a position swap between block (i, j, k) and block (k, j, i) is performed.

Figure 10:
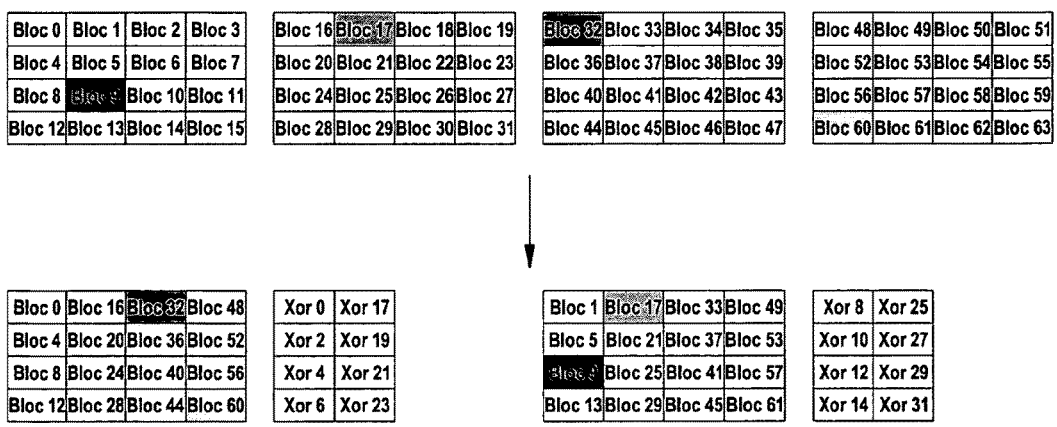
FIG. 10: illustrates the permutation of blocks after interleaving.

FIG. 10 gives an example of the error correction coding technique performed on 4-block frames and a 4-matrix group. Colored blocks show positions before and after FC_IFEC coding. The result produced shows the two first encoded matrices.

Certain XOR blocks (odd numbers) have changed position (XOR blocks of matrix 2 are closed to those of matrix 0, those of matrix 3 to those of matrix 1 . . . ). If any loss happens during transmission, only half of the matrix correction blocks are lost. The encoded stream that is generated corresponds to the block suite: 0, 16, 32, 48, XOR 0, XOR 17, 4, 20, 36, 52 . . . .

4. FC_pMUX (Multiplexer)

Figure 7:
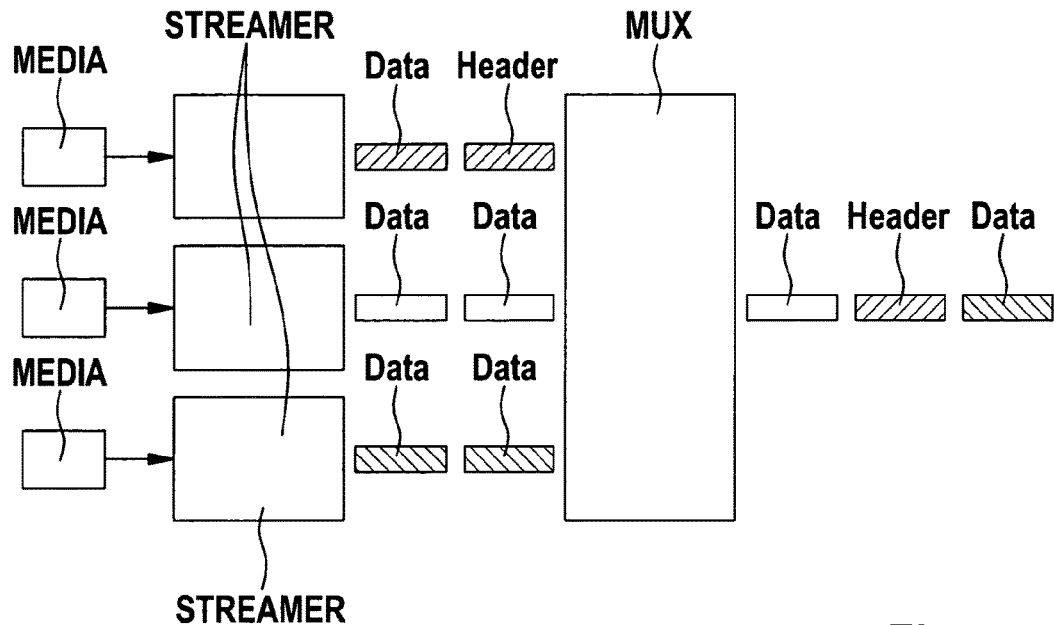
FIG. 7: illustrates the block mixing process.

The FC_pMUX is aimed at mixing the different single streams produced by the FC_STREAMER processes in order to generate a single stream containing all delivery meta data and media payload (see FIG. 7).

The FC_pMUX also controls the bit rate of the stream that is generated and adapts it to the available bandwidth provided by the cable company, the ISP or the satellite operator. One important function of the FC_pMUX is the interaction with the FC_pSCHEDULER so that the bandwidth allocation to different media delivery requests is optimized.

Figure 8:
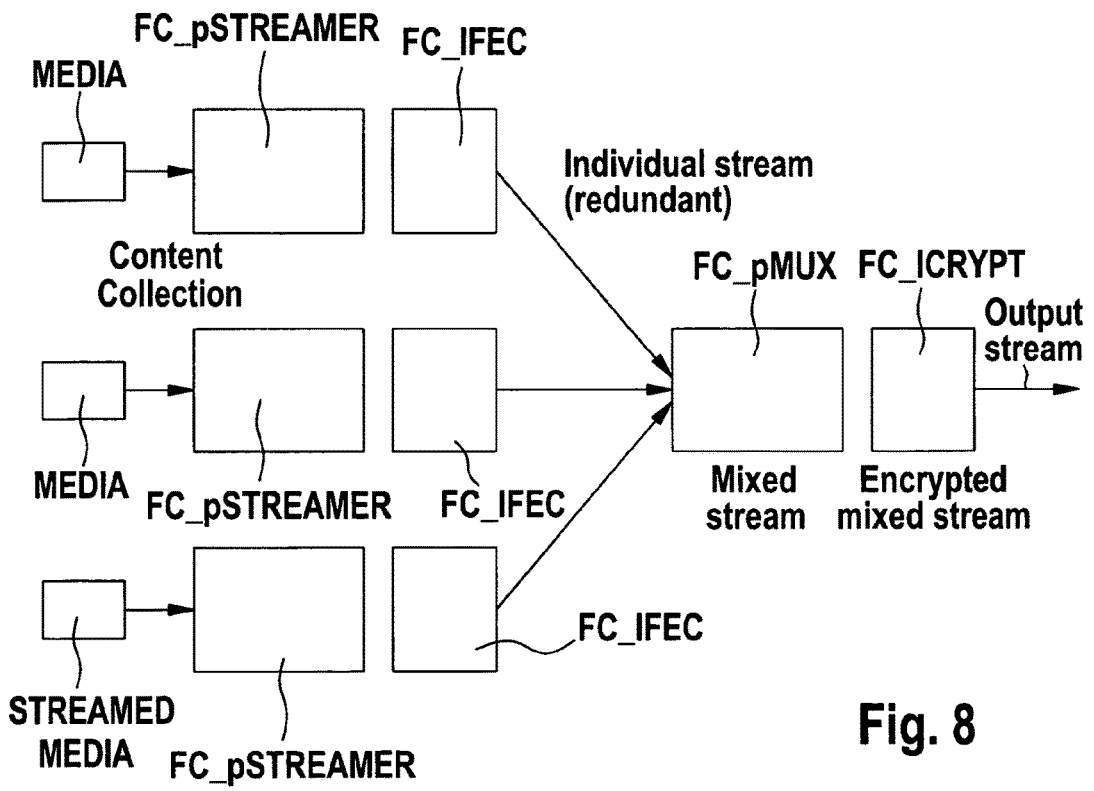
FIG. 8: shows the streamer—multiplexer interface architecture.

FIG. 8 shows that the 2 types of content (file and stream) can be mixed into a unique stream: as a matter of fact, content output by the FC_pSTREAMER is always streamed.

The different modules of the centralized distribution server can be run on distributed systems with different OS: Windows NT/2000/XP and 2003 Server, Linux (SuSE, Mandriva, RedHat . . . ).

5. FC_lCRYPT (Encryption/Decryption)

Nowadays encryption of valuable content has become essential to guarantee a maximum protection of copyright holders. Current distribution networks (DSL Internet, satellite broadcasting) enable users equipped with the correct connection equipment (DSL modem, satellite dish) an easy and fast access to lots of content. Such an opportunity can become a flaw when comes the question to limit content availability to groups of users who are duly authorized. Only encryption mechanisms which apply on content itself (DRM for instance) and during transmission over the network can efficiently protect this right.

The FC_lCRYPT library module provides an innovative and very secure on-the-fly encryption system of the transmission by applying coding algorithms based on the modulo arithmetic (such as RSA or El-Gamal) to the stream. The FC_lCRYPT library module is applied to the multiplexed output stream produced by the FC_pMUX over its associated forward channel network.

In a preferred embodiment, the encryption method used is based on a private key system. The same key is used for both encryption and decryption. The principle is to split the stream into 32-bit blocks (4 Bytes) and to apply each block (called m for message-payload) a series of transformations in accordance with the parameters, which constitute the key to produce c the encrypted code.

The key is made with a group of 8 numbers of 16 bits (total of 128 bits). Each number represents a prime number ($p_i$ as the i-th number) of 32 bits comprised within the interval [FFD3889F, FFFFFFFB] (hexadecimal values). There is $2^{16}=65536$ prime numbers in this interval. Full encryption is performed by 8 iterations. Iteration i uses the number $p_i$, i varying from 1 to 8. We note $c_i$ as the result of the i-th encryption iteration with: $c_i=c_{i-1}^2 \pmod{p_i}$ and $c_0=m$.

The final encryption step corresponds to $c=c_8$. The encryption scheme full benefit is derived from the impossibility to find out m from c without knowing $p_1, p_2 \ldots p_8$, which is the key.

Figure 9:
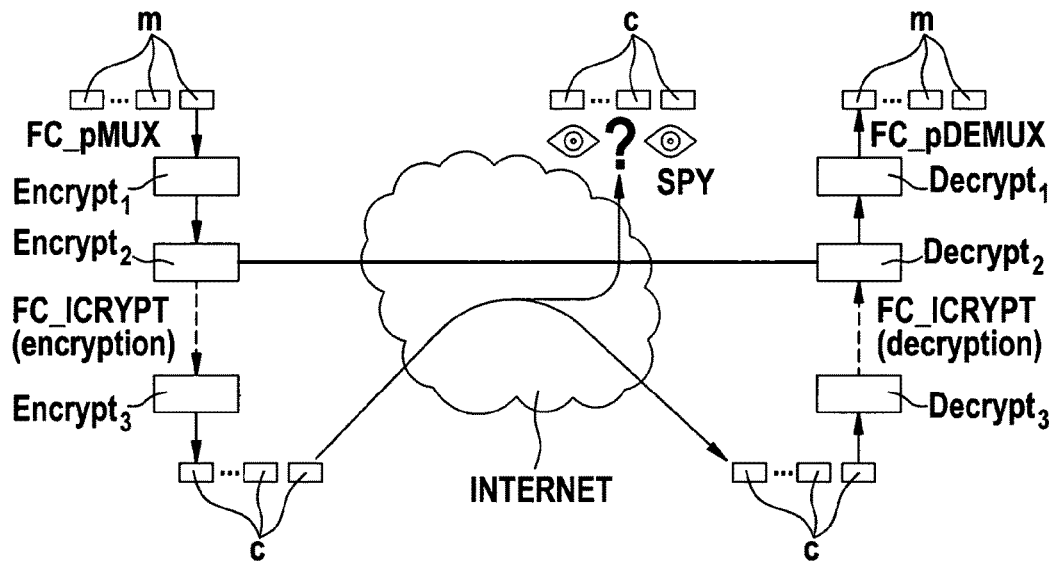
FIG. 9: illustrates the encryption and decryption of blocks.

FIG. 9 shows an example of an encrypted stream delivery over the Internet. Only receiving clients with the right decryption key can restore the original message. A middle-of-the-road spy would not be capable to view and steal the data.

Decryption just consists of applying the data blocks the encryption reverse transformations. We start with the 8th iteration to finish with the $1^{st}$, i varying from 8 to 1. At each iteration, we compute $c_{i-1}=c_i^{1/2} \pmod{p_i}$ and $c_8=c$. The final decryption step yields to $c_o$ which makes m.

6. FC_pDEMUX (Receiver)

The role of the FC_pDEMUX is to
a) decrypt on-the-fly the mixed stream produced by the FC_pMUX (through the reverse function of FC_lCRYPT);
b) restore from the mixed stream the individual stream built by the FC_pSTREAMER: an execution instance (thread) is associated with each individual stream;
c) correct transmission errors (through the reverse function of FC_lFEC if applied to the individual stream): this is done by each thread;
d) acquire the data packets from the individual stream; check whether the content data embedded therein is authorized and if yes restore the initial content;
e) return to the FC_pBACK (feedback management module) the content reception acknowledgement as well as the content access acknowledgment when the content is released to the user (automatically or after the user's request) after its decryption;
f) execute a procedure on the subscriber's terminal.

The reception stream may not contain all the blocks that have been emitted. The FC_lFEC library module copes with that situation. Due to the encoded data stream generated by the FC_lFEC (further to the FC_pSTREAMER) after interleaving, missing blocks if any will be distributed across the whole content blocks. Computations made on XOR blocks will enable to restore (re-create) the missing blocks.

Figure 11:
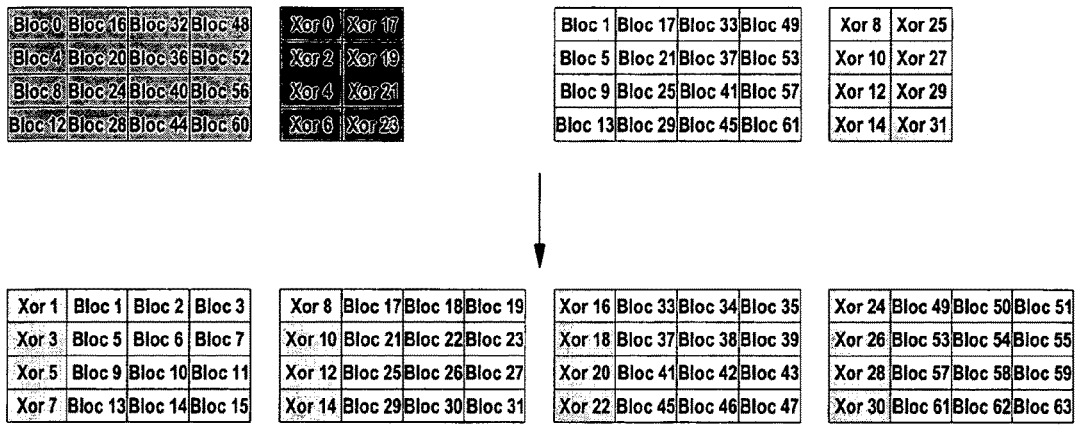
FIG. 11: illustrates the lost blocks restoration operation.

FIG. 11 shows an example of error correction. Assume that light grayed blocks have not been transmitted to a receiver. Thanks to a permutation these initial blocks corresponding to the missing ones have been spread over a group of matrices. The XOR blocks take the place of the missing ones: XOR computations with the other blocks enable the restoration of lost blocks. The example demonstrates that XOR blocks permutation is key to the correction mechanism performance. Indeed without permutation, all correction blocks of the first matrix (notably blocks XOR 1, 3, 5 et 7) would have been respectively at the same places that blocks XOR 17, 19, 21 et 23) and correction would have been impossible to achieve.

The stream that is received is encrypted (by AES or the encryption module) to guarantee full protection of the data payload. The decryption mechanism (through the reverse function of FC_lCRYPT) uses a private key. This key is itself encrypted with the AES or the encryption module technique and stored encrypted on the hard drive of the receiver.

In order for the key to be useful, an identification/authentication local system releases the key encryption, restores the key in the central memory, and starts the stream decryption process.

The frame header packet of a single stream generated by the FC_pSTREAMER contains specific information to be passed to the receiver and which tell the receiver how to process the content. The FC_pDEMUX module will store this information in order to restore the initial single streams.

Figure 12:
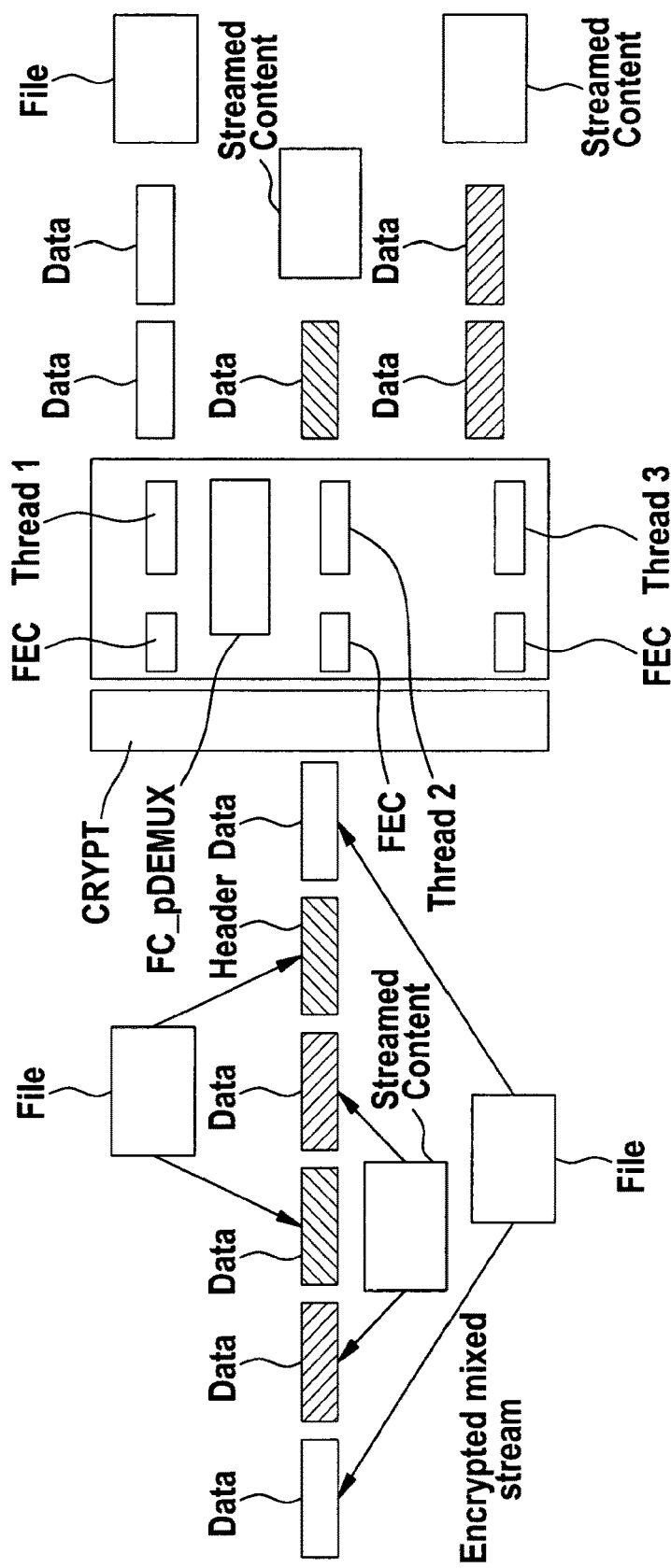
FIG. 12: illustrates the initial individual streams restoration operation.

FIG. 12 shows how the FC_pDEMUX will restore the initial individual streams from the mixed stream. It can be noticed that the light grey stream (initially a file content) can be transformed into a streamed content after modifications of the frame packet header by the de-multiplexer. This is a powerful functionality of the delivery technology to change at reception a content type into another.

7. FC_pBACK

This module manages all acknowledgement information coming from the return channels (client to server return link if available), such as the file reception and the file decryption acknowledgements.

Despite the FC_lFEC mechanisms implemented by the technology in order to increase the delivery process resilience to signal disruptions, it may still happen that in some cases data packets are lost during transmission. To address such a situation, if a return path is available, the FC_pBACK will receive full reporting on the possibly data lost during transmission. It interacts with the FC_pSTREAMER to start re-transmission of possible missing data (see also FIG. 13).

Files to be delivered are split into packets by the FC_pSTREAMER, which sends them to the FC_pMUX. Each of these packets are identified individually and traced so that the FC_pDEMUX (receiver) can retrieve them one by one. The FC_pDEMUX will then forward back to the FC_pBACK (via the return path if available) the missing packet numbers.

Figure 13:
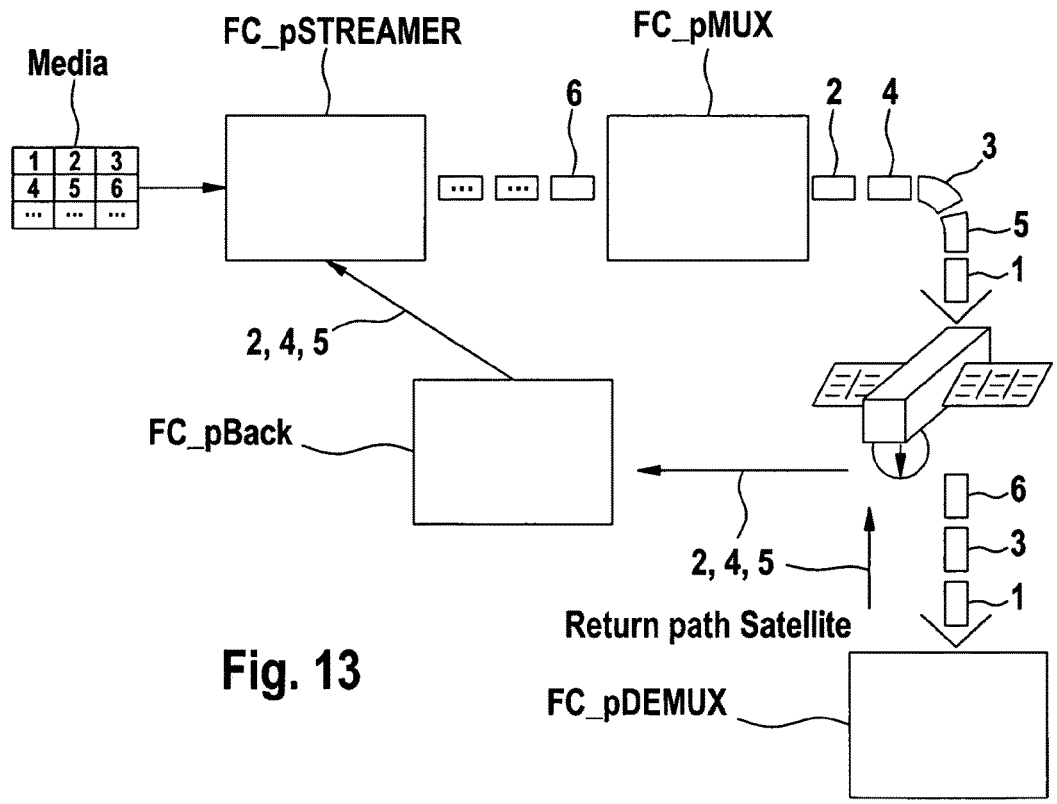
FIG. 13: illustrates the principle of the return channel re-transmission process.

The FC_pBACK requests the FC_pSTREAMER to re-transmit the missing packets. The FC_pDEMUX will wait for these packets in order to fully reconstitute the original file. Such a process may take a certain time during which intermediary packets are kept stored by the FC_pDEMUX. Time-out termination process is implemented. Once the file is fully complete and received, then the FC_pDEMUX will send an acknowledgement to the FC_pBACK. FIG. 13 shows the example of satellite broadcasting to an FC_pDEMUX. For some reasons (not necessarily linked to the satellite signal quality which is rather good, but for instance due to some networking equipments—switch, IP/DVB encapsulation . . . —which randomly loose frame packets), packets 2, 4, 5 are not received in the first run. This information will be passed by the FC_pDEMUX to the FC_pBACK via a satellite return path. The FC_pBACK will then ask the FC_pSTREAMER to re-send the packets in a second run. The process stops when all packets are received or with time-out termination depending on operating parameters.

8. FC_pMONITOR

The FC_pMONITOR is in charge of achieving the end-to-end delivery system supervision. Its assignments are to collect real time monitoring information from the different modules with no direct interaction (exchange goes through a monitoring library module FC_lMonitor which is linked to all the modules) to be displayed in the administration interface FC_sADMIN.

The supervision interface gathers in a GUI the following control panel indicators:
a) from the FC_pSTREAMER: byte volume emitted, media type, media identification (name, or port and IP address), bitrate.
b) from the FC_pMUX: byte volume emitted, channel number, bitrate.
c) from the FC_pSCHEDULER: bandwidth allocation status.
d) from the FC_pDEMUX (via the return link if any): file reception acknowledgement, file decryption acknowledgement, packet loss rate per reader.

Only file-based content (movies, music tracks, documents, programs . . . ) can require the automatic re-transmission of specific data packets. Indeed stream-based content are processed in real time by the receiver and lost information do not need to be retransmitted for they would arrived too late. Actually stream-based content uses the FC_lFEC technique for real time corrections.

Benefits Summary of the System

The main benefits of the above described architecture may be summarized as follows:

The proposed technology targets delivers a full turnkey service packed to conduct all operations ranging from content acquisition to scheduling, encryption and delivery with advanced options for system administration and accounting.

The service package consists of secure, reliable, fully managed, end-to-end, multicast, unicast, worldwide, on time encrypted content delivery via any networks (multipoint, point-to-point, satellite, terrestrial, mobile, hybrid) all from a fully centralized web-based system with state-of-the-art user interfaces.

To establish protection against piracy, the delivery platform implements a double encryption scheme: the content file (with DRM where required) is encrypted, and the data stream to carry content is itself encrypted on-the-fly. The authorized receiver subsequently decrypts stream: the receiver will then de-encapsulate data and reconstitute the encrypted file as it was constituted before transmission.

The technology guarantees end-to-end traceability of encrypted content circulation.

The proposed technology enables the transmission of all types of file content (data, audio, video, binary and others) and all types of streamed content (data, voice, digital radio and televisions and others). The delivery process can be operated in 3 ways:
  with the point-to-point mode using the TCP unicast protocol. Each receiving user is directly connected to a server
  by pointing to a server enabled with the UDP unicast protocol. Each user receives a unique UDP stream
  with the UDP multicast protocol. Each user receives a UDP stream common to any listening user All these different delivery modes can be combined into a flexible stream to address singular or multiple data transmission strategies whatever the protocols and telecoms networks used or its requirements.

Content streaming is encrypted on the fly and subsequently decrypted in real time by the receiving user. Each user is identified by a unique addressing system and its rights agreements or licenses grant access to authorized content (files or streams): this list can be dynamically updated either by the user or in a centralized way by the content owner/operator.

Digital rights: The new technology implements at server side and client side a comprehensive content access key system which interfaces with the DRM to protect content and their restricted use, as well as with the SMS (Subscriber-user Management Systems) which manage authorizations. This key management system enables the system operator to open (and or close) the right of a user to receive content (in whole or in part), as well as the right to sell content. When the rights are removed (by order of the content owner), then content become absolutely inaccessible for the user.

Multiplexing: The present streaming system enables simultaneously transport of several different content types (organized in logical channels) at the same time whatever their delivery mode (TCP/IP, UDP unicast, UDP multicast). It is then possible to receive a file or a full directory while listening to a streamed radio channel or watching a streamed movie. The delivery chain can dynamically mix (multiplex) several sources of initial content into a unique data stream and then restore them at reception.

Networks: The streamed data flows generated by the distribution server can exploit any type of physical telecommunications networks. The server can deliver secure and robust data streams directly to a LAN, a corporate network, the Internet (via VPN tunneling), and any cable, WIFI or satellite network.

Subscriber's terminal: The receiver software can be integrated to many different terminals (PC, set-top-box, PDA, mobile phone . . . ) whatever the delivery network.

What is claimed:

1. A subscriber terminal, comprising:
a receiver module comprising a first generator module, wherein the receiver module is configured for receiving an encrypted digital delivery stream containing data packets from a centralized distribution server, the centralized distribution server having a converter module for embedding content data into the encrypted digital delivery stream and a scheduler module configured for managing content distribution;
an interface module configured for enabling access to said data packets of said digital delivery stream or the content data embedded therein by a subscriber,
a first generator module configured for automatic generation of a receipt acknowledgement upon receipt of at least one data packet of said digital delivery stream by said receiver module;
a second generator module configured for automatic generation of an access acknowledgement after decryption of the encrypted stream into an unencrypted data stream and upon release of at least one data packet of the digital delivery stream and the content data embedded therein to a user via the interface module; and
a transmitter module configured for transmitting said receipt and access acknowledgements to the centralized distribution server via a return network channel.

2. The subscriber terminal of claim 1, further comprising a decryption module for decrypting said encrypted stream into an unencrypted data stream and/or an unencrypted mixed stream and wherein said second generator module for generating said access acknowledgement is responsive to said decryption module and generates said access acknowledgement upon decryption of the encrypted stream into an unencrypted data stream and/or an unencrypted mixed stream.

3. The subscriber terminal of claim 1, wherein said encrypted digital delivery stream is provided with a redundant coding scheme and wherein said receiver module of said at least one subscriber terminal comprises an error correction module for reconstituting data lost during transmission based on said redundant coding scheme.

4. The subscriber terminal of claim 1, wherein said receiver module of said at least one subscriber terminal comprises a demultiplexer module for de-multiplexing a mixed stream into individual data streams.

5. The subscriber terminal of claim 1, wherein said access acknowledgement is generated without any selections or interactions by the user beyond said access of the digital delivery stream and/or the content data embedded therein by the user.

6. A subscriber terminal, comprising:
a receiver module comprising a first generator module, wherein the receiver module is configured for receiving an encrypted digital delivery stream containing data packets from a centralized distribution server, the centralized distribution server having a converter module for embedding content data into the encrypted digital delivery stream and a scheduler module configured for managing content distribution;
an interface module configured for enabling access to said data packets of said digital delivery stream or the content data embedded therein by a subscriber,
a first generator module configured for automatic generation of a receipt acknowledgement upon receipt of each data packet of said digital delivery stream by said receiver module;
a second generator module configured for automatic generation of an access acknowledgement after decryption of the encrypted stream into an unencrypted data stream and upon release of each data packet of the digital delivery stream and the content data embedded therein to a user via the interface module; and
a transmitter module configured for transmitting said receipt and access acknowledgements to the centralized distribution server via a return network channel.

7. The subscriber terminal of claim 6, further comprising a decryption module for decrypting said encrypted stream into an unencrypted data stream and/or an unencrypted mixed stream and wherein said second generator module for generating said access acknowledgement is responsive to said decryption module and generates said access acknowledgement upon decryption of the encrypted stream into an unencrypted data stream and/or an unencrypted mixed stream.

8. The subscriber terminal of claim 6, wherein said encrypted digital delivery stream is provided with a redundant coding scheme and wherein said receiver module of said at least one subscriber terminal comprises an error correction module for reconstituting data lost during transmission based on said redundant coding scheme.

9. The subscriber terminal of claim 6, wherein said receiver module of said at least one subscriber terminal comprises a demultiplexer module for de-multiplexing a mixed stream into individual data streams.

10. The subscriber terminal of claim 6, wherein said access acknowledgement is generated without any selections or interactions by the user beyond said access of the digital delivery stream and/or the content data embedded therein by the user.

11. A subscriber terminal, comprising:
a receiver module comprising a first generator module, wherein the receiver module is configured for receiving an encrypted digital delivery stream containing data packets from a centralized distribution server, the centralized distribution server having a converter module for embedding content data into the encrypted digital delivery stream and a scheduler module configured for managing content distribution;
an interface module configured for enabling access to said data packets of said digital delivery stream or the content data embedded therein by a subscriber,
a first generator module configured for automatic generation of a receipt acknowledgement upon receipt of at least every other data packet of said digital delivery stream by said receiver module;
a second generator module configured for automatic generation of an access acknowledgement after decryption of the encrypted stream into an unencrypted data stream and upon release of at least every other data packet of the digital delivery stream and the content data embedded therein to a user via the interface module; and
a transmitter module configured for transmitting said receipt and access acknowledgements to the centralized distribution server via a return network channel.

12. The subscriber terminal of claim 11, further comprising a decryption module for decrypting said encrypted stream into an unencrypted data stream and/or an unencrypted mixed stream and wherein said second generator module for generating said access acknowledgement is responsive to said decryption module and generates said access acknowledgement upon decryption of the encrypted stream into an unencrypted data stream and/or an unencrypted mixed stream.

13. The subscriber terminal of claim 11, wherein said encrypted digital delivery stream is provided with a redundant coding scheme and wherein said receiver module of said at least one subscriber terminal comprises an error correction module for reconstituting data lost during transmission based on said redundant coding scheme.

14. The subscriber terminal of claim 11, wherein said receiver module of said at least one subscriber terminal comprises a demultiplexer module for de-multiplexing a mixed stream into individual data streams.

15. The subscriber terminal of claim 11, wherein said access acknowledgement is generated without any selections or interactions by the user beyond said access of the digital delivery stream and/or the content data embedded therein by the user.

16. A subscriber terminal, comprising:
a receiver module comprising a first generator module, wherein the receiver module is configured for receiving an encrypted digital delivery stream containing data packets from a centralized distribution server, the centralized distribution server having a converter module for embedding content data into the encrypted digital delivery stream and a scheduler module configured for managing content distribution;
an interface module configured for enabling access to said data packets of said digital delivery stream or the content data embedded therein by a subscriber,
a first generator module configured for automatic generation of a receipt acknowledgement at predetermined intervals;
a second generator module configured for automatic generation of an access acknowledgement at predetermined intervals after decryption of the encrypted stream into an unencrypted data stream and upon passage of said predetermined interval; and
a transmitter module configured for transmitting said receipt and access acknowledgements to the centralized distribution server via a return network channel.

17. The subscriber terminal of claim 16, further comprising a decryption module for decrypting said encrypted stream into an unencrypted data stream and/or an unencrypted mixed stream and wherein said second generator module for generating said access acknowledgement is responsive to said decryption module and generates said access acknowledgement upon decryption of the encrypted stream into an unencrypted data stream and/or an unencrypted mixed stream.

18. The subscriber terminal of claim 16, wherein said encrypted digital delivery stream is provided with a redundant coding scheme and wherein said receiver module of said at least one subscriber terminal comprises an error correction module for reconstituting data lost during transmission based on said redundant coding scheme.

19. The subscriber terminal of claim 16, wherein said receiver module of said at least one subscriber terminal comprises a demultiplexer module for de-multiplexing a mixed stream into individual data streams.

20. The subscriber terminal of claim 16, wherein said access acknowledgement is generated without any selections or interactions by the user beyond said access of the digital delivery stream and/or the content data embedded therein by the user.

21. A subscriber terminal, comprising:
a receiver module comprising a first generator module, wherein the receiver module is configured for receiving an encrypted digital delivery stream containing data packets from a centralized distribution server, the centralized distribution server having a converter module for embedding content data into the encrypted digital delivery stream and a scheduler module configured for managing content distribution;
an interface module configured for enabling access to said data packets of said digital delivery stream or the content data embedded therein by a subscriber,
a first generator module configured for automatic generation of a receipt acknowledgement upon the passage of a predetermined amount of time;
a second generator module configured for automatic generation of an access acknowledgement after decryption of the encrypted stream into an unencrypted data stream and upon the passage of said predetermined amount of time; and
a transmitter module configured for transmitting said receipt and access acknowledgements to the centralized distribution server via a return network channel.

22. The subscriber terminal of claim 21, further comprising a decryption module for decrypting said encrypted stream into an unencrypted data stream and/or an unencrypted mixed stream and wherein said second generator module for generating said access acknowledgement is responsive to said decryption module and generates said access acknowledgement upon decryption of the encrypted stream into an unencrypted data stream and/or an unencrypted mixed stream.

23. The subscriber terminal of claim 21, wherein said encrypted digital delivery stream is provided with a redundant coding scheme and wherein said receiver module of said at least one subscriber terminal comprises an error correction module for reconstituting data lost during transmission based on said redundant coding scheme.

24. The subscriber terminal of claim 21, wherein said receiver module of said at least one subscriber terminal comprises a demultiplexer module for de-multiplexing a mixed stream into individual data streams.

25. The subscriber terminal of claim 21, wherein said access acknowledgement is generated without any selections or interactions by the user beyond said access of the digital delivery stream and/or the content data embedded therein by the user.

26. A subscriber terminal, comprising:
a receiver module comprising a first generator module, wherein the receiver module is configured for receiving an encrypted digital delivery stream containing data packets from a centralized distribution server, the centralized distribution server having a converter module for embedding content data into the encrypted digital delivery stream and a scheduler module configured for managing content distribution;
an interface module configured for enabling access to said data packets of said digital delivery stream or the content data embedded therein by a subscriber,
a first generator module configured for automatic generation of a receipt acknowledgement upon the transfer of a predetermined number of packets;
a second generator module configured for automatic generation of an access acknowledgement after decryption of the encrypted stream into an unencrypted data stream and upon the transfer of said predetermined number of packets; and a transmitter module configured for transmitting said receipt and access acknowledgements to the centralized distribution server via a return network channel.

27. The subscriber terminal of claim 26, further comprising a decryption module for decrypting said encrypted stream into an unencrypted data stream and/or an unencrypted mixed stream and wherein said second generator module for generating said access acknowledgement is responsive to said decryption module and generates said access acknowledgement upon decryption of the encrypted stream into an unencrypted data stream and/or an unencrypted mixed stream.

28. The subscriber terminal of claim 26, wherein said encrypted digital delivery stream is provided with a redundant coding scheme and wherein said receiver module of said at least one subscriber terminal comprises an error correction module for reconstituting data lost during transmission based on said redundant coding scheme.

29. The subscriber terminal of claim 26, wherein said receiver module of said at least one subscriber terminal comprises a demultiplexer module for de-multiplexing a mixed stream into individual data streams.

30. The subscriber terminal of claim 26, wherein said access acknowledgement is generated without any selections or interactions by the user beyond said access of the digital delivery stream and/or the content data embedded therein by the user.

31. A subscriber terminal, comprising:
a receiver module comprising a first generator module, wherein the receiver module is configured for receiving an encrypted digital delivery stream containing data packets from a centralized distribution server, the centralized distribution server having a converter module for embedding content data into the encrypted digital delivery stream and a scheduler module configured for managing content distribution;
an interface module configured for enabling access to said data packets of said digital delivery stream or the content data embedded therein by a subscriber,
a first generator module configured for automatic generation of a receipt acknowledgement upon the transfer of a predetermined amount of data;
a second generator module configured for automatic generation of an access acknowledgement after decryption of the encrypted stream into an unencrypted data stream and upon the transfer of said predetermined amount of data; and
a transmitter module configured for transmitting said receipt and access acknowledgements to the centralized distribution server via a return network channel.

32. The subscriber terminal of claim 31, further comprising a decryption module for decrypting said encrypted stream into an unencrypted data stream and/or an unencrypted mixed stream and wherein said second generator module for generating said access acknowledgement is responsive to said decryption module and generates said access acknowledgement upon decryption of the encrypted stream into an unencrypted data stream and/or an unencrypted mixed stream.

33. The subscriber terminal of claim 31, wherein said encrypted digital delivery stream is provided with a redundant coding scheme and wherein said receiver module of said at least one subscriber terminal comprises an error correction module for reconstituting data lost during transmission based on said redundant coding scheme.

34. The subscriber terminal of claim 31, wherein said receiver module of said at least one subscriber terminal comprises a demultiplexer module for de-multiplexing a mixed stream into individual data streams.

35. The subscriber terminal of claim 31, wherein said access acknowledgement is generated without any selections or interactions by the user beyond said access of the digital delivery stream and/or the content data embedded therein by the user.

36. A subscriber terminal, comprising:
a receiver module comprising a first generator module, wherein the receiver module is configured for receiving an encrypted digital delivery stream containing data packets from a centralized distribution server, the centralized distribution server having a converter module for embedding content data into the encrypted digital delivery stream and a scheduler module configured for managing content distribution;
an interface module configured for enabling access to said data packets of said digital delivery stream or the content data embedded therein by a subscriber,
a first generator module configured for automatic generation of a receipt acknowledgement upon the transfer of a predetermined percentage of the content data in the digital delivery stream;
a second generator module configured for automatic generation of an access acknowledgement after decryption of the encrypted stream into an unencrypted data stream and upon the transfer of said predetermined percentage of content data; and
a transmitter module configured for transmitting said receipt and access acknowledgements to the centralized distribution server via a return network channel.

37. The subscriber terminal of claim 36, further comprising a decryption module for decrypting said encrypted stream into an unencrypted data stream and/or an unencrypted mixed stream and wherein said second generator module for generating said access acknowledgement is responsive to said decryption module and generates said access acknowledgement upon decryption of the encrypted stream into an unencrypted data stream and/or an unencrypted mixed stream.

38. The subscriber terminal of claim 36, wherein said encrypted digital delivery stream is provided with a redundant coding scheme and wherein said receiver module of said at least one subscriber terminal comprises an error correction module for reconstituting data lost during transmission based on said redundant coding scheme.

39. The subscriber terminal of claim 36, wherein said receiver module of said at least one subscriber terminal comprises a demultiplexer module for de-multiplexing a mixed stream into individual data streams.

40. The subscriber terminal of claim 36, wherein said access acknowledgement is generated without any selections or interactions by the user beyond said access of the digital delivery stream and/or the content data embedded therein by the user.

41. A subscriber terminal, comprising:
a receiver module comprising a first generator module, wherein the receiver module is configured for receiving an encrypted digital delivery stream containing data packets from a centralized distribution server, the centralized distribution server having a converter module for embedding content data into the encrypted digital delivery stream and a scheduler module configured for managing content distribution;
an interface module configured for enabling access to said data packets of said digital delivery stream or the content data embedded therein by a subscriber, a first generator module configured for automatic generation of a receipt acknowledgement upon the transfer of a predetermined quantity of content data;

a second generator module configured for automatic generation of an access acknowledgement after decryption of the encrypted stream into an unencrypted data stream and after the transfer of said predetermined quantity of content data; and a transmitter module configured for transmitting said receipt and access acknowledgements to the centralized distribution server via a return network channel.

42. The subscriber terminal of claim 41, further comprising a decryption module for decrypting said encrypted stream into an unencrypted data stream and/or an unencrypted mixed stream and wherein said second generator module for generating said access acknowledgement is responsive to said decryption module and generates said access acknowledgement upon decryption of the encrypted stream into an unencrypted data stream and/or an unencrypted mixed stream.

43. The subscriber terminal of claim 41, wherein said encrypted digital delivery stream is provided with a redundant coding scheme and wherein said receiver module of said at least one subscriber terminal comprises an error correction module for reconstituting data lost during transmission based on said redundant coding scheme.

44. The subscriber terminal of claim 41, wherein said receiver module of said at least one subscriber terminal comprises a demultiplexer module for de-multiplexing a mixed stream into individual data streams.

45. The subscriber terminal of claim 41, wherein said access acknowledgement is generated without any selections or interactions by the user beyond said access of the digital delivery stream and/or the content data embedded therein by the user.

46. A method for transmitting tracking information from a client terminal to a server, comprising the steps of:

receiving an encrypted digital delivery stream containing data packets from the server;

enabling access to said data packets of said digital delivery stream or the content data embedded therein by a subscriber;

generating a receipt acknowledgement upon receipt of at least one data packet of said digital delivery stream by said receiver module;

generating an access acknowledgement after decryption of the encrypted stream into an unencrypted data stream and upon release of at least one data packet of the digital delivery stream and the content data embedded therein to a user via the interface module; and transmitting said receipt and access acknowledgements to the server via a return network channel.

\* \* \* \* \*